Nov. 21, 1950     A. MURAT     2,531,289
TRAILER HITCH
Filed June 2, 1947
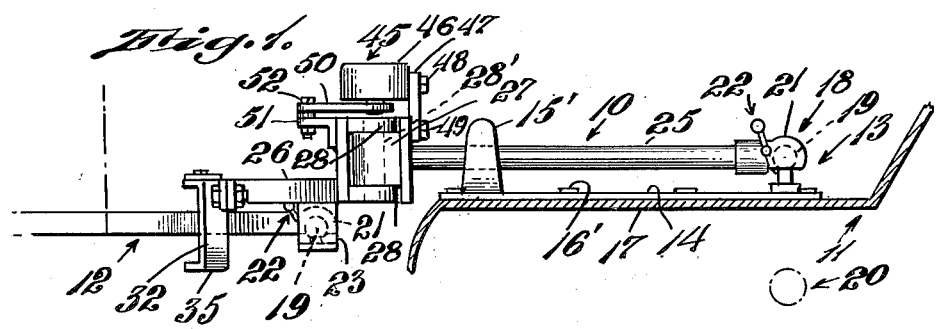
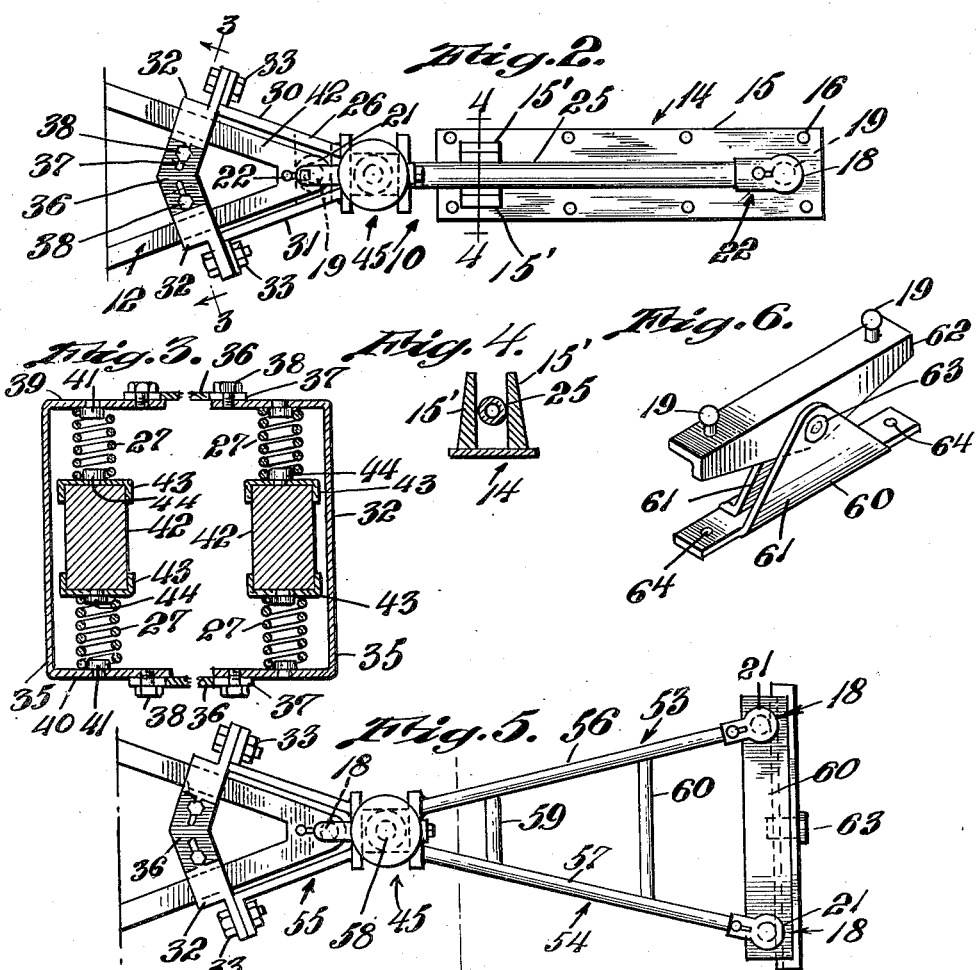
INVENTOR.
Adolf Murat
BY Barlow & Barlow
ATTORNEYS.

Patented Nov. 21, 1950

2,531,289

UNITED STATES PATENT OFFICE 2,531,289

TRAILER HITCH

Adolf Murat, Laguna Beach, Calif.

Application June 2, 1947, Serial No. 751,754

7 Claims. (Cl. 280—33.44)

This invention relates to improvements in trailer hitches, particularly the type used on pleasure cars for towing trailer coaches.

Hitches of this particular type are usually made to be attached to the bumper of the pleasure car which provides the tow. Attaching a hitch to the bumper of the tow car is undesirable since it results in having an overhanging weight at the bumper.

One of the objects of this invention is the provision of a trailer hitch which may be attached to the tow car at a location removed from the bumper thereof.

Another object of this invention is the provision of a trailer hitch constructed so as to be attached to the tow car in such a manner that the load will be carried at a location above the rear axle of the tow car.

A more specific object of this invention is the provision of a trailer hitch constructed so as to be attached directly above the rear axle of the tow car.

Another object of this invention is the provision of a trailer hitch constructed so as to provide a resilient connection between the draw bar of the hitch and the chassis of the trailer coach.

Another object of this invention is the provision of a trailer hitch constructed so as to provide added support when turning the vehicles on sharp turns.

Another object of this invention is the provision of a trailer hitch constructed so that certain moving parts thereof will be momentarily arrested in movement when a sudden change in direction of travel between the two vehicles occurs.

Another object of this invention is the provision of a trailer hitch constructed so as to relieve twisting strains on the trailer chassis when the two vehicles are moving over uneven road surfaces.

Another object of this invention is the provision of a trailer hitch so constructed as to absorb the usual road shocks.

With these and other objects in view, the invention consists of certain novel features of construction as will be more fully described and particularly pointed out in the appended claims.

In the accompanying drawings:

Fig. 1 is a side elevational view of a trailer hitch embodying my invention;

Fig. 2 is a top plan view of the same;

Fig. 3 is a sectional view taken substantially along line 3—3 of Fig. 2;

Fig. 4 is a sectional view taken substantially along the lines 4—4 of Fig. 2;

Fig. 5 is a top plan view of a modified construction of trailer hitch;

Fig. 6 is a perspective view of the draw bar attaching support of the construction shown in Fig. 5.

The invention comprises generally a trailer hitch construction wherein the draw bar is made in two sections. These are movably related for movement about an axis positioned at a location intermediate the points of attachment of the hitch to the towed and towing vehicles. This pivotal mounting, in addition to the usual ball connection, provides for greater flexibility in controlling the towed vehicle. I also provide for positioning the point of attachment of the hitch to the towing vehicle at a location thereon preferably directly above the rear axle thereof.

In order to prevent sudden relative movement between the hitch sections, such as may cause a so-called jackknife action to take place as might occur in a sudden, abrupt change in direction of travel of the towing vehicle, particularly that resulting from a rear tire blow-out, I provide for momentarily checking or arresting relative movement between the two sections of the draw bar. A mechanism which I have found satisfactory in use is a rotary type of shock absorber which I mount across the pivotal axis of the hitch sections. There is also provided means on one of the hitch sections for absorbing usual road shocks which otherwise would be transmitted to the vehicle.

Referring to the drawings for a more detailed description of the invention, 10 designates generally the trailer hitch, 11 the floor of the tow car and 12 the tongue portion of the chassis of the trailer vehicle. I arrange for attaching the draw bar of the hitch to the tow car at a location remote from the bumper. Preferably I provide a support designated generally 14 which may be fastened to the floor of the tow car with the point of attachment for the draw bar positioned at a location to be directly above the rear axle of the car. This support comprises a base plate 15 apertured as at 16 for receiving bolts or the like 16' for securing the plate 15 to the floor 17 of the tow car. The term floor as herein used is intended to include and apply to any bottom portion of the car body to which a support may be attached so as to locate the point of attachment of the hitch at the desired location relative to the rear axle. For example, the plate 15 may be secured to the floor or bottom of the trunk compartment of the tow car.

The draw bar may be attached to the support in any appropriate manner such as by a ball coupling 18 so as to provide a limited relative movement between the support and the draw bar. This ball coupling comprises a usual ball portion 19 which may be secured to the plate 15 in any appropriate manner and at a location thereon to preferably extend directly above and in a vertical line with the rear axle 20 of the tow vehicle. The socket portion 21 of this coupling is attached to the draw bar such as by a friction fit and is provided with a usual locking mechanism designated generally 22 which may be of any approved design and usually forming part of a coupling of this type. The base 15 is also provided with upright guides 15' between which extends the draw bar section 25.

The opposite end portion of the draw bar may also be attached to the trailer chassis tongue 12 by a similar ball coupling 18 so as to also provide for limited relative movement at this point of attachment of the draw bar. The ball portion 19 of this coupling is secured to a bracket 23 which is suspended from the rear portion of the draw bar. The socket portion 21 of the coupling is attached and carried by the trailer chassis tongue 12. This coupling is also provided with the usual locking device 22.

In order to provide for greater flexibility in controlling the towed vehicle, I make the draw bar in two sections 25 and 26. These I pivotally relate in such a manner that relative movement may be had between the sections about an axis extending in a general vertical direction and at a location intermediate the points of attachment of the draw bar to the vehicles. To this end, the section 25 is provided with a bearing ear 27, and the section 26 is provided with spaced bearing ears 28 between which is received the bearing ear 27. A pin or the like 28' extends through the ears 27 and 28 which pivotally mounts the two sections together. The rear section 26 extends a substantial distance and comprises spaced arms 30 and 31 which extend rearwardly in a general V formation to conform in general to the tongue portion 12 of the trailer. To these arms 30 and 31 housings 32 are attached such as by means of bolt and nut connections 33. Each housing is of a similar construction and comprises a channel iron 35 open at either end and through which extends the tongue 12 of the trailer chassis. These housings are rigidly secured to each other in adjustable position by means of a plate 36 which is provided with elongated slots 37 through which extend bolts 38 to secure the same to the walls of the housing 32.

Between the upper wall 39 and the lower wall 40 of each housing there extends compression springs 27. These springs are anchored at their outer ends to the walls 39 and 40 by means of pins 41 projecting inwardly from the walls into the spring to serve as guides. The bars 42 which form the tongue 12 extend between the inner ends of the springs 27. Each bar 42 is provided with oppositely positioned clips 43 which are provided with pins 44. These pins are received in the inner end portion of the springs and provide guides and anchors for each spring 27. It will be apparent that by means of this arrangement a restricted resilient movement is permitted to be had between the chassis tongue 12 of the trailer and the draw bar whereby usual road shocks transmitted through the draw bar are absorbed by the springs 27.

Upon the failure of a rear tire on the tow car, such as may occur by a blow-out, there is a liability of a so-called jackknife action occurring between the trailer and tow car which may result in a serious accident. To prevent such action occurring, I momentarily arrest relative movement between the draw bar sections 25 and 26 upon an abrupt or sudden change in direction of the tow car. To this end, I mount a mechanism designated generally 45 to extend across the pivot connection between the draw bar sections. This mechanism operates so as to check any sudden relative movement between the draw bar sections. A mechanism which I have found to operate satisfactorily for this purpose is a conventional rotary type shock absorber. This shock absorber may be of any well-known manufacture such as that used on "Ford cars." The body 46 of this shock absorber may be provided with a strap 47 depending therefrom and bolted thereto, such as by a bolt 48. The lower end portion of this strap 47 is attached to the draw bar section 25, such as by means of a bolt connection 49. The arm 50 of the shock absorber is attached to a support 51 which is in the form of an angle iron providing a bracket which is fixed to the section 26 of the draw bar by any appropriate means such as by a weld joint.

When the vehicles are traveling over a road having an uneven surface or in making turns at sharp angles, there is a tendency to transmit through the hitch a twisting strain on the trailer chassis. In order to eliminate such a transmission, I provide a modified construction, such as is shown in Fig. 5. This modified construction comprises a draw bar designated generally 53 also made in two sections 54 and 55. The section 55 is a duplicate of section 26 above described. The section comprises two angularly spaced tubular members 56 and 57 arranged to converge toward the pivotal connection designated generally 58 and which may be of a construction similar to the pivotal connection between the sections 25 and 26 previously described. Between these tubular arms 56 and 57 are laterally extending braces 59 and 60. The support for the point of attachment for the arms 56 and 57 in this present construction comprises a base portion 60, best shown in perspective in Fig. 6. This base portion has upright arms 61 between which is received a member 62. This member 62 is rockably mounted between the arms 61 by means of a pivot 63 extending generally horizontally. The section 54 is attached to the member 60 by means of ball couplings similar to the ball coupling 18 previously described. The free end portion of each arm 56 and 57 is provided with a socket 21 which receives the ball portions 19 which are secured to the end of member 60 so as to extend upwardly therefrom. The base is also provided with openings 64 for receiving screws or the like means for attaching the same to the floor plate 17 of the tow car.

As previously stated, the connections between the sections 54 and 55 are similar to that above described and there is also provided a shock absorbing mechanism 45.

In the operation of this modified construction, the member 62 will be free to rock about the pivot 63 so as to adjust the hitch to compensate for road unevenness or turning at sharp angles and thus prevent any twisting action which would otherwise be transmitted through the draw bar to the chassis of the trailer coach.

I claim:

1. In a trailer hitch, a draw bar, means for securing said draw bar to a towing vehicle comprising a support having a base portion adapted to be attached to the rear portion of the floor of the towing vehicle and a draw bar attaching member movably mounted thereon for movement about an axis extending generally horizontally, means for attaching said support to the rear floor portion of the towing vehicle, and a ball joint connection on each side of said axis for attaching said draw bar to said member.

2. In a trailer hitch, a draw bar, means for securing said draw bar to a towing vehicle comprising a support having a base portion adapted to be attached to the rear portion of the floor of the towing vehicle and a member connected thereto for rocking movement about a horizontal axis, and a ball joint connection on opposite sides of said axis for attaching said draw bar to said member.

3. A trailer hitch comprising a draw bar made in two sections, means for pivotally securing said sections to each other for relative movement about a vertical axis, means on one of said sections for attaching said draw bar to a towing vehicle, means on the other section for attaching said draw bar to the chassis tongue of a trailer, said other section having a housing rigidly related thereto through which said tongue extends, and resilient means flexible in a general vertical direction carried by said housing and engaging said tongue for resilient restricted movement between said tongue and said other section.

4. A trailer hitch comprising a draw bar made in two sections, means for pivotally securing said sections to each other for relative movement about an axis extending generally vertically, means on one of said sections for attaching said draw bar to a towing vehicle, means on the other section for attaching said draw bar to the chassis tongue of a trailer, and rotary means secured to said sections adjacent the pivotal mounting thereon for momentarily arresting relative movement between said sections upon sudden change in direction of travel of said vehicle.

5. A trailer hitch comprising a draw bar made in two sections, means for pivotally securing said sections to each other for relative movement about an axis extending generally vertically, means on said sections for attaching said draw bar to the towing and to the trailer vehicles, and a rotary type shock absorber having a portion thereof secured to one of said sections and another relatively movable portion thereof secured to the other of said sections with the axis of rotation of said shock absorber extending substantially in line with the first said axis.

6. A trailer hitch comprising a rockably mounted support having a base portion adapted to be attached to the rear portion of the floor of the towing vehicle, a draw bar made in two sections, means for pivotally securing said sections to each other for relative movement about an axis extending generally vertically, one of said sections comprising spaced arms extending from the pivotal mounting of said sections to opposite sides of said axis, and a ball joint connection for attaching said arms to said support, said ball joint connection extending directly above the rear axle of the towing vehicle.

7. In a trailer hitch, a draw bar, a support having a base secured to the rear portion of the floor of a towing vehicle and having guides extending upwardly therefrom between which said draw bar extends, a ball joint connection for attaching said draw bar to said support, said ball joint connection extending at a position located directly above the rear axle of the towing vehicle.

ADOLF MURAT.

REFERENCES CITED

The following references are of record in the file of this patent:

UNITED STATES PATENTS

| Number | Name | Date |
|---|---|---|
| 1,990,731 | Greer | Feb. 12, 1935 |
| 2,162,481 | Fry | June 13, 1939 |
| 2,170,898 | Humphry | Aug. 29, 1939 |
| 2,238,095 | Almcrantz | Apr. 15, 1941 |
| 2,329,380 | Arehart | Sept. 14, 1943 |
| 2,379,170 | McDaniel | June 26, 1945 |
| 2,425,449 | Wilson | Aug. 12, 1947 |